Aug. 31, 1954  R. L. COLEMAN  2,687,550
DEVICE FOR STUNNING POULTRY
Filed Jan. 25, 1952  2 Sheets-Sheet 1
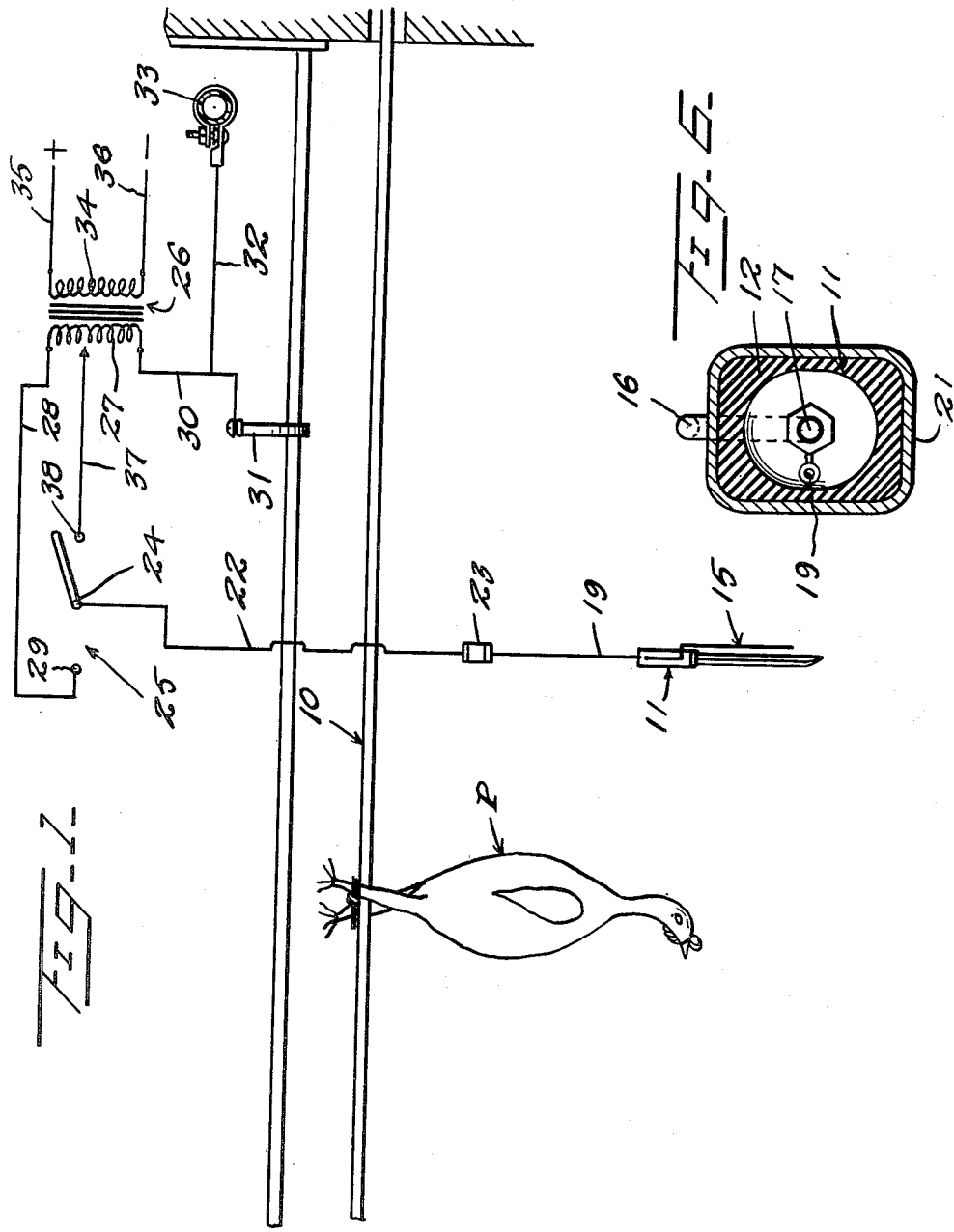
INVENTOR.
R. L. Coleman
BY
Kimmel & Crowell Attys.

Aug. 31, 1954
R. L. COLEMAN
2,687,550
DEVICE FOR STUNNING POULTRY
Filed Jan. 25, 1952
2 Sheets-Sheet 2
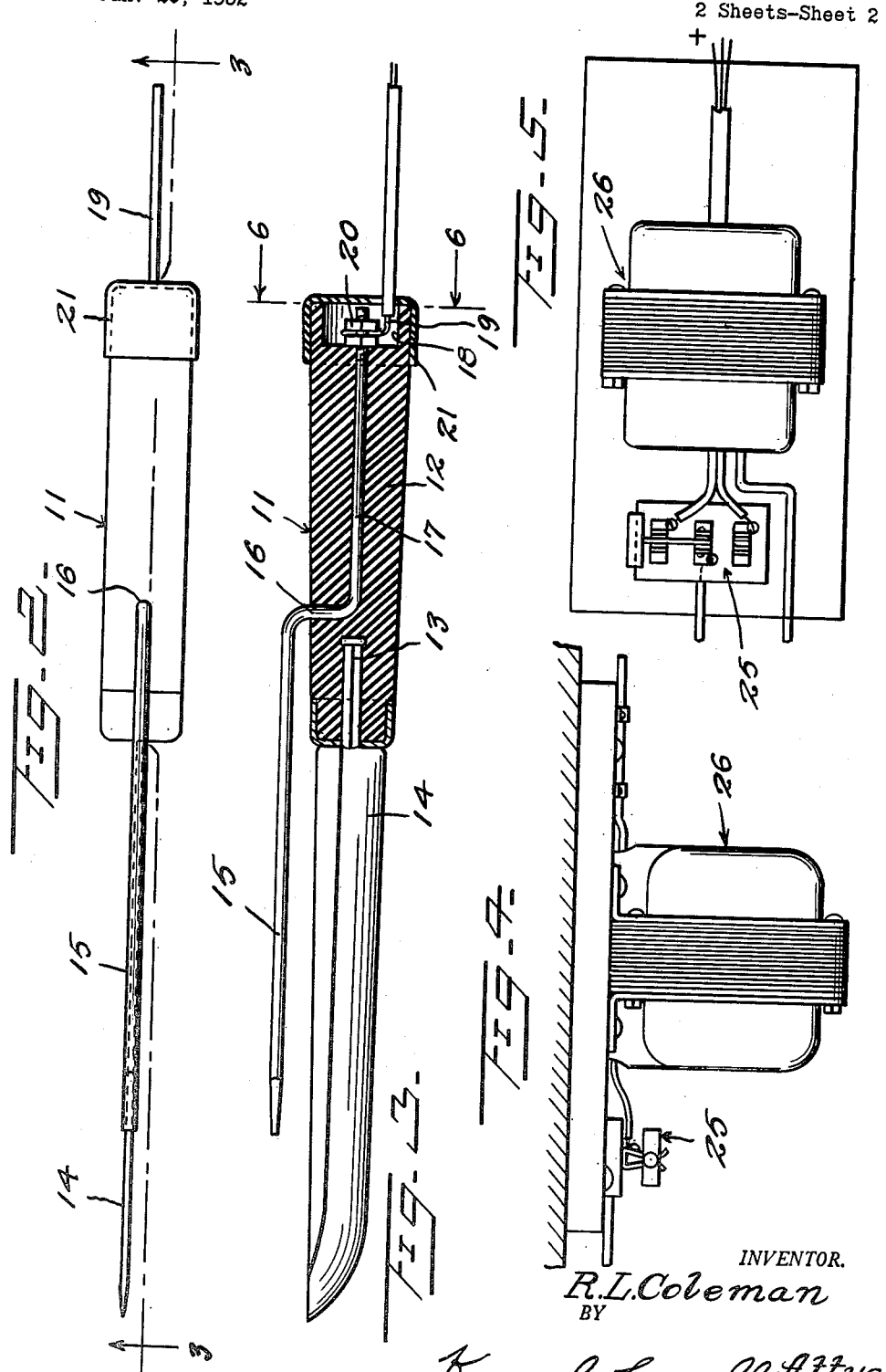
INVENTOR.
R. L. Coleman
BY
Kimmel & Crowell Attys Patented Aug. 31, 1954

2,687,550

UNITED STATES PATENT OFFICE 2,687,550

DEVICE FOR STUNNING POULTRY

Reginald L. Coleman, Somerset, Pa.

Application January 25, 1952, Serial No. 268,175

1 Claim. (Cl. 17—11)

This invention relates to a device for killing poultry.

When poultry is being killed in a butchering plant, the fowls are suspended by the feet from a moving conveyor and the jugular vein is cut so that the fowl will bleed profusely, and normally the fowl will struggle to a great extent and blood will be scattered about quite a wide area.

It is, therefore, an object of this invention to provide a means whereby the fowl may be stunned before the jugular vein is cut and before the fowl recovers from the shock it will be dead.

Another object of this invention is to provide in combination with a knife, an electrode which is fixed to the knife and spaced from the knife blade so that the electrode will not interfere with the normal use of the blade.

A further object of this invention is to provide in combination with a knife, an electrode disposed spaced from the back of the knife blade and insulated from the latter so that the blade will not be charged with electricity.

With the above and other objects in view, my invention consists in the arrangement, combination and details of construction disclosed in the drawings and specification, and then more particularly pointed out in the appended claim.

In the drawings:

Figure 1 is a diagrammatic view of a poultry killing device constructed according to an embodiment of this invention.

Figure 2 is a plan view of the knife and electrode.

Figure 3 is a sectional view taken on the line 3—3 of Figure 2.

Figure 4 is a detailed side elevation of the transformer used with this device.

Figure 5 is a bottom plan view of the transformer.

Figure 6 is a sectional view taken on the line 6—6 of Figure 3.

Referring to the drawings, and first to Figure 1, the numeral 10 designates generally a movable conveyor of the type conventionally used in butchering plants whereby poultry are suspended by their feet in order that the poultry may be killed by projecting a knife through the jugular vein. In order to provide a means whereby the poultry indicated at P may be killed without struggling and without splattering blood, I have provided a poultry stunning or paralyzing means which includes a knife generally designated as 11. The knife 11 is formed of a handle 12 with a cutting blade 14 extending therefrom. The handle 12 is preferably formed out of plastic or other suitable insulating material, and the blade 14 includes a shank 13 embedded within the forward end of the handle 12. The knife 11 also includes an elongated electrode 15 which extends parallel with the back edge of the blade 14 and terminates at its forward end rearwardly of the forward end of blade 14. The electrode 15 also includes a right angular extension 16 projecting into the body of the handle 12 and also includes a longitudinal projection 17 which is embedded in the handle 12.

The rear of handle 12 is formed with a recess 18, and one end of a conductor 19 is secured to the rear end of extension 17 by means of a nut 20. An insulated cap 21 engages over the rear end of handle 12 and encloses the opening or socket 18 so as to prevent direct contact with the terminal rear end of electrode extension 17. Conductor 19 is connected to a conductor 22 by means of a connector 23, and the length of the two conductors 19 and 22 is such that the knife 11 will be disposed in suspended position above a floor when the knife is not in use. The other or upper end of conductor 22 is connected to a movable switch arm 24 of a single-pole double-throw switch, generally indicated at 25. A step-up transformer, generally indicated at 26, of conventional construction has one end of the secondary 27 thereof connected by means of a conductor 28 to a stationary contact 29 of switch 25. The other end of the secondary 27 is connected by means of a conductor 30 to a ground connection 31 which is secured to the conveyor 10.

A second ground conductor 32 connects conductor 30 to a water pipe 33 or the like. The primary 34 of the transformer is adapted to be connected by conductors 35 and 36 to a source of electric current supply. The transformer 26 has the characteristic of stepping up the voltage while reducing the amperage of the electric current from the electric source. A conductor 37 is connected at one end to a second stationary or fixed contact 38 of switch 25 and the other end of conductor 37 is connected to the secondary 27 between the ends of the latter so as to provide a current of reduced voltage. This reduced current voltage is designed for use in the stunning or paralyzing of small fowl; such as chickens or the like; whereas the full length of coil 27 is designed for use in killing larger fowl; such as turkeys or the like.

In the use and operation of this device, the switch arm 24 is thrown to engage the desired contact of switch 25. As an example, if the poultry P is a turkey, switch arm 24 is swung to engage contact 29. Electrode 15 is then brought into contact with the head or neck of the turkey so as to thereby shock the turkey sufficiently to paralyze the same without killing the turkey. The knife 11 is then turned over and the point of blade 14 is extended through the jugular vein in order that the turkey will bleed profusely in an unconscious state and will thereby be killed without struggling before regaining consciousness.

In this manner, the turkey will not struggle and the blood will not be splattered about as is the case where the turkey is cut when alive. It will be understood that for the protection of the butcher, the hands of the butcher are preferably covered with rubber or other insulating gloves, and rubber shoes or boots will also be worn by the butcher. By providing the electrode 15 on the back of the knife blade 14 and spaced therefrom, the knife blade will not have any current passing therethrough and the blade will not thereby be subjected to the action of the electric current which has a tendency to dull or otherwise injure the blade.

I do not mean to confine myself to the exact details of construction herein disclosed, but claim all variations falling within the purview of the appended claim.

What is claimed is:

A device for stunning poultry comprising a knife handle of insulating material, said handle having a recess in one end thereof, an electrode comprising a metallic rod extending longitudinally of said handle from said recess, said rod thence extending outwardly through the side of the handle and terminating in a portion substantially parallel to said first mentioned portion but offset from the plane of said handle and projecting beyond the opposite end of said handle, and potential means connected to said electrode in said recess.

References Cited in the file of this patent

UNITED STATES PATENTS

| Number | Name | Date |
| --- | --- | --- |
| 1,580,790 | MacAllister | Apr. 13, 1926 |
| 1,970,294 | Field | Aug. 14, 1934 |
| 2,210,376 | Onorato et al. | Aug. 6, 1940 |
| 2,245,880 | Tipton et al. | June 17, 1941 |
| 2,512,089 | Cervin | June 20, 1950 |
| 2,536,220 | Rabin | Jan. 2, 1951 |